(12) United States Patent
Buskila et al.

(10) Patent No.: US 8,436,075 B2
(45) Date of Patent: *May 7, 2013

(54) ARTIFICIAL MARBLE

(75) Inventors: Liat Eliahu Buskila, Sdot-Yam (IL); Yaakov Gal, Sdot-Yam (IL)

(73) Assignee: Caesarstone Sdot-Yam Ltd., Kibbutz Sdot Yam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/137,771

(22) Filed: Sep. 12, 2011

(65) Prior Publication Data

US 2012/0003453 A1      Jan. 5, 2012

Related U.S. Application Data

(63) Continuation of application No. 12/232,844, filed on Sep. 25, 2008, now Pat. No. 8,026,298.

(60) Provisional application No. 60/960,322, filed on Sep. 25, 2007.

(51) Int. Cl.
    *C09D 5/29*      (2006.01)
(52) U.S. Cl.
    USPC ............................. 523/171; 523/205; 523/210
(58) Field of Classification Search ............... 523/171, 523/205, 210
    See application file for complete search history.

(56) References Cited

U.S. PATENT DOCUMENTS

| 4,493,875 | A | 1/1985 | Beck |
| 4,678,819 | A | 7/1987 | Sasaki et al. |
| 6,432,329 | B1 | 8/2002 | Cohen |
| 6,517,915 | B1 | 2/2003 | Banus |
| 8,026,298 | B2 * | 9/2011 | Buskila et al. ............... 523/171 |

FOREIGN PATENT DOCUMENTS

| EP | 0771935 | 8/2001 |
| EP | 1251113 | 10/2002 |
| JP | 05058698 | 3/1993 |
| WO | WO9918046 | 4/1999 |
| WO | WO0005302 | 2/2000 |
| WO | WO2006084792 | 8/2006 |

OTHER PUBLICATIONS

International Search Report for PCT/IB2008/053902 dated Mar. 13, 2009.

* cited by examiner

*Primary Examiner* — Edward Cain
(74) *Attorney, Agent, or Firm* — Eitan, Mehulal & Sadot (57) ABSTRACT

An engineered stone slab has coated lumps of composite stone material, wherein at least a portion of the coated lumps comprise an inner core having a first property and an outer layer having a second property. The property may include color, texture, density, chemical composition, hardness, porosity or any combination thereof.

17 Claims, 11 Drawing Sheets

ARTIFICIAL MARBLE

CROSS-REFERENCE TO RELATED APPLICATIONS

The present application is a continuation application of U.S. application Ser. No. 12/232,844, which was filed in the U.S. Patent and Trademark Office on Sep. 25, 2008, now U.S. Pat. No. 8,026,298 which claims benefit of U.S. Provisional Application 60/960,322 filed Sep. 25, 2007, the disclosure of both which is incorporated herein by reference.

BACKGROUND OF THE INVENTION

Quartz is the most common oxide on the surface of the earth. Quartz is the crystalline form of silicon dioxide ($SiO_2$) and is one of the hardest materials in nature. Among many other uses, quartz may be used for the production of various stone materials. The quartz containing stone materials may be used, for example, in the preparation of slabs, surfaces, and the like. Quartz containing stone material may be used for various purposes, such as, for example: interior wall cladding, fireplace mantles and surroundings, wainscots and wall bases, bank teller lines, table and desktops, elevator cab walls and floors, floor tile and stair treads, food service areas, shower and tub surrounds, toilet compartment partitions, window seats, countertops and backlashes.

As compared to other natural stone compositions, such as granite and marble, quartz containing stone material may be stronger and more durable than natural stone compositions. In addition, quartz containing stone material may be cleaner, safer and more consistent than other stone surfaces. Furthermore, quartz containing stone materials may be more resistant to: breakage, scratching, stain, heat, chemicals, freeze-thaw damage, and the like.

The production of quartz containing stone material may involve mixing inorganic quartz matrix and organic polymers that may be bound by linker compounds. The binding between the inorganic quartz matrix and the organic polymers may influence the resistance of the final composition of the quartz containing stone material.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other advantages or improvements.

According to some embodiments, lumps (nuggets) of composite material may be prepared and may further be used for the manufacturing of artificial marble and artificial marble slabs. The lumps of composite material may be comprised of various compositions of such materials as inorganic particulate component (such as silicon, basalt, glass, diamond, rocks, pebbles, shells, a variety of quartz containing materials, and the like), polymers, binders, mixtures, resins, colorants, dyes, pigments, and the like, or any combination thereof. The lumps of composite materials may assume any three-dimensional shape, such as for example, squared shape, rounded shape, spiked shape, amorphous and the like, and may further be prepared at any size. The lumps of composite material may further exhibit any surface type, such as a smooth surface, uneven surface, rigid surface, and the like. The lumps of composite stone material may include one or more layers, wherein the layers may have different properties. The lumps of composite material may further be used for the preparation of artificial marble that may exhibit various patterns that may be formed by the lumps of composite material.

According to some embodiments, there is provided a method for the preparation of an engineered stone slab having coated lumps of composite stone material, the method includes scooping a first inorganic particulate material and a polymer material to produce lumps of composite stone material and mixing a second inorganic particulate material with the lumps to produce coated lumps. The scooping, the mixing or both may be performed in a mixer having a mixing hook which comprises an extension. The extension may include a flat surface, two interconnected surfaces, a spoon-shaped surface or any combination thereof. The first inorganic particulate material, the second inorganic particulate material, or both, may include quartz.

According to further embodiments, the method for the preparation of an engineered stone slab having coated lumps of composite stone material may further include adding one or more colorants to the first inorganic particulate material, the second inorganic particulate material or to both.

According to other embodiments, the coated lumps may include an inner core having a first property and an outer layer having a second property. The property may include such properties as, color, texture, density, chemical composition, hardness, porousivity or any combination thereof. The shape of the lumps may substantially round, substantially circular, spiked, or any combination thereof.

According to further embodiments, the first inorganic particulate material may include particles having a size range of about 0.05 mm to about 5 mm. The second inorganic particulate material may include particles having a size range of about 35 micron to about 50 microns. The polymer may include a binder, hardener, initiator, or any combination thereof.

According to additional embodiments, the scooping may be performed at a varying mixing speed. The mixing may be performed at a varying mixing speed.

According to further embodiments, the method for the preparation of an engineered stone slab having coated lumps of composite stone material may further include mixing a third inorganic particulate material with the coated lumps to produce multi-layer coated lumps.

According to some embodiments, there is provided an engineered stone slab having coated lumps of composite stone material, wherein at least a portion of the coated lumps include an inner core having a first property and an outer layer having a second property. The property may include color, texture, density, chemical composition, hardness, porousivity or any combination thereof. The lumps may include composite stone material. The distribution of the lumps within the slab may be uniform, non-uniform or both. The size of the lumps may be uniform, non-uniform, or both. The shape of the lumps may substantially round, substantially circular, spiked, or any combination thereof.

According to some embodiments, there is provided a method for the preparation of a composite stone material having over 65% in the form of lumps, the method including mixing inorganic quartz material, adding resin to the inorganic quartz material, and adding ground inorganic quartz material to the mixture of inorganic quartz material and resin, wherein the lumps are adapted to essentially retain the integrity thereof. The composite stone material may have over 75% in the form of lumps. The composite stone material may have over 85% in the form of lumps.

According to some embodiments, there is provided a method for the preparation of a composite stone material, at least a portion of the material having a form of lumps, the method including mixing inorganic quartz material, resin, ground inorganic quartz material, wherein the mixing is performed by a mixer having mixing blade(s) which include an extended mixing surface such as a spatula or a flat surface, a curved surface, two interconnected surfaces, a spoon-shaped surface, or any combination thereof. The lumps are adapted to essentially retain the integrity thereof.

According to some embodiments there is provided a method for the preparation of lumps of composite stone material that may include mixing inorganic quartz material and one or more of the following: colorant, resin, grounded inorganic quartz material, or any combination thereof; and wherein said mixing may be performed at a predetermined speed, such as in the range of 1-15 m/sec.

According to some embodiments, the inorganic quartz material that may be in the method for the preparation of lumps of composite stone material may include sand of various particle sizes, such as in the range of about 0.05 mm to 10 mm. The inorganic quartz material may further include ground sand of a particle size in the range of about 1 micron to 65 microns. The particle size may include, for example, the largest diameter of the particle, the longest dimension of the particle, and the like. The inorganic quartz material may further include any other natural and/or artificial material that may contain inorganic quartz, such as, for example, basalt, glass, diamond, rocks, pebbles, shells, silicon, or any combination thereof.

According to some embodiments, the colorant may include any dye, pigment, colorant and any combination thereof. The resin may include polymer (such as polyester), binder (such as silane), hardener, initiator, and the like, or any combination thereof.

According to some embodiments, the lumps of composite material may include any form, such as, for example, substantially round lumps, substantially circular, spiked, or any combination thereof.

According to further embodiments, the method for preparation of lumps of composite stone material may further include mixing at a predetermined speed, such as in the range of, for example, 1 to 15 m/sec. The mixing may be performed in a mixer or a drum mixer that may further include a modified mixing blade or modified mixing drum, respectively.

According to some embodiments, there is provided an artificial marble slabs comprising lumps of composite stone materials, wherein at least a portion of the lumps include at least one colored coating layer. In another embodiment, at least a portion of the lumps includes two or more colored coating layers, wherein each layer may be colored by a different colorant or a similar colorant at different dosages and/or concentrations. According to some embodiments, there is provided an artificial marble slab comprising lumps of composite stone materials, wherein at least a portion of the lumps include at least one colored coating layer, wherein the resulting slab has a veined effect.

According to some embodiments, there is provided an artificial marble slab comprising over 65% lumps of composite stone materials. According to some embodiments, there is provided an artificial marble slab comprising over 75% lumps of composite stone materials. According to some embodiments, there is provided an artificial marble slab comprising over 85% lumps of composite stone materials. According to some embodiments, there is provided an artificial marble slab comprising over 95% lumps of composite stone materials.

In addition to the exemplary aspects and embodiments described above, further aspects and embodiments will become apparent by reference to the figures and by study of the following detailed descriptions.

DETAILED DESCRIPTION OF THE INVENTION

In the following description, various aspects of the invention will be described. For the purpose of explanation, specific configurations and details are set forth in order to provide a thorough understanding of the invention. However, it will also be apparent to one skilled in the art that the invention may be practiced without specific details being presented herein. Furthermore, well-known features may be omitted or simplified in order not to obscure the invention.

A composite stone material, such as, for example, artificial marble/engineered stone/quartz surfaces/composite stone, may be composed of various materials. For example, a composite stone material may be composed mainly of organic polymer(s) and inorganic particulate component. The inorganic particulate component may include such components as silicon, basalt, glass, diamond, rocks, pebbles, shells, a variety of quartz containing materials, such as, for example, but not limited to: crushed quartz, sand, quartz particles, and the like, or any combination thereof. For example, the inorganic quartz material may include sand of various particle sizes and of different combinations. Linkage between the organic and inorganic compounds may be carried out and/or facilitated by using binder molecules, such as, for example, mono-functional or multifunctional silane molecules, dendrimeric molecules, and the like, that may have the ability to bind the organic and inorganic components of the composite stone. The binders may further include a mixture of various components, such as initiators, hardeners, catalysators, binding molecules and bridges, or any combination thereof. The manufacturing process of the composite stone material may include blending of raw material (such as inorganic quartz and organic polymers, unsaturated polymers, and the like, such as polyester) at various ratios. For example, the composite stone material may include about 8-95% natural quartz aggregates to about 5-15% polymer resins. For example, the composite stone material may include about 93% natural quartz aggregates and about 7% polymer resins. In addition, any desired amounts of various additives, may be added to blending of raw materials, at various stages of production. For example, such additives may include, colorants, dyes, pigments, chemical reagents, antimicrobial substances, fungicidal agents, and the like, or any combination thereof. As a result of adding various additives to the blending of raw materials, the additives may be present in the final composite stone product and may further change various characteristics of the composite stone. Such characteristics may include, for example, physical properties, such as: color, texture, display pattern, and the like; chemical properties, such as, for example, chemical resistance, pH properties, and the like; biological properties, such as, for example, antibacterial properties, and the like; and mechanical properties, such as, for example, strength, scratch resistance, impact resistance, and the like. The resulting mixture may later be poured to a support or a temporary support, such as rubber, paper, plastic or any other polymeric material, water soluble paper, silicon sheet or the like with or without a support frame or a shaping frame, a mold such as a rubber tray mold or any other appropriate support. The mixture is poured substantially in the form of a desired slab (for example, at a size of 306 cm×144 cm with or without wall shaping). The mixture may then be compacted by a special vacuum and vibration process such as vibrocompaction at high pressure, such as about 100 tons. Then, the compressed mixture may be placed in a curing and/or hardening kiln, for example, at a temperature in the range of 80° C. to 115° C. for 30 to 60 minutes until it hardens and assumes natural stone properties, but with greater performance and higher resistance to stains and impact, as detailed below. After completion of the casting process, the slabs may be flattened, gauged, calibrated and polished to a high and enduring shine or any desired finish to be used at various settings, such as, for example, interior wall cladding, fireplace mantles and surroundings, wainscots and wall bases, bank teller lines, table and desktops, elevator cab walls and floors, floor tile and stair treads, food service areas, shower and tub surrounds, toilet compartment partitions, window seats and countertops.

Composite stone material that may be composed mainly of organic polymer(s) and inorganic quartz matrix, manufactured as described hereinabove may possess enhanced properties as compared to natural stones. For example, the composite stone material may exhibit flexural strength in the range of about 485-545 $Kg/Cm^2$. For example, the composite stone material may exhibit flexural strength of about 515 $Kg/Cm^2$. Water absorption by weight of the composite stone material may be at the range of about 0 to 0.04 percent. For example, water absorption by weight of the composite stone material may be about 0.02 percent. Compressive strength of the composite stone material may be in the range of 2000-2400 $Kg/Cm^2$. For example, compressive strength of the composite stone material may be about 2200 $Kg/Cm^2$. Freezing compressive strength (after 25 cycles of freeze-thaw) of the composite stone material may be in the range of 1800-2400 $Kg/Cm^2$. For example, freezing compressive strength (after 25 cycles of freeze-thaw) of the composite stone material may be about 2082 $Kg/Cm^2$. Absorption of the composite stone material may be in the range of 0 to 0.004 percent. For example, absorption of the composite stone material may be about 0.002 percent. Density of the composite stone material may be in the range of 60 to 80 $g/cm^2$. Mohs hardness of the composite stone material, as may be determined by a scratch test may be in the range of 5-8, on a scale of 1-10, wherein 10 is diamond. For example, Mohs hardness of the composite stone material may be about 6.5. Taber abrasion index at 1000 cycles of the composite stone material may be in the range of 110-270. Thermal expansion of the composite stone material may be in the range of 7.5-10 (X0.000001 in/in/deg C.). Stain resistance of the composite stone material may be in the range of 50-64 (wherein the maximal rating is 64). Ball impact resistance of the composite stone material may be in the range of 80 to 200 cm. Radiant heat resistance of the composite stone material demonstrates no damage. Likewise, boiling water and high temperature do not demonstrate an effect on the composite stone material.

As referred to herein, the terms "lumps", "lumps of artificial", "lumps of composite stone material", "nuggets", may interchangeably be used.

As referred to herein, the terms, "composite stone material", "artificial marble", "engineered stone" and "quartz surfaces" may interchangeably be used.

As referred to herein, the term "colorant" may include dyes, pigments, colorants, and the like, or any combination thereof in any form, such as liquid, paste, fluid, or the like.

As referred to herein, the terms "blade", "leg", "hook" in relation to a mixing device may interchangeably be used. For example, the terms "mixer blade" and mixer leg" may interchangeably be used.

According to some embodiments, lumps of composite material may be prepared and may further be used for the manufacturing of artificial marble and artificial marble slabs. The lumps of composite material may be comprised of various compositions of such materials as inorganic quartz matrixes, polymers, binders, resins, colorants, dyes, pigments, and the like. The lumps of composite materials may assume any three-dimensional shape, such as, for example, squared shape, rounded shape, spiked shape, diamond-like shape, and the like, and may further be prepared in any size. The lumps of composite material may further exhibit any surface type, such as smooth surface, uneven surface, rigid surface, and the like. The lumps of composite material may further be used for the preparation of artificial marble that may exhibit various patterns that may be formed by the lumps of composite material.

According to some embodiments, lumps of composite material may be manufactured such that they acquire a substantially rounded shape, with a substantially smooth surface and a substantially rigid texture. Upon their production, the lumps may retain their structure under various conditions. The lumps of composite material may include such materials as inorganic quartz matrix, such as sand, of various particle sizes and/or any other material that may contain inorganic quartz; a mixture of polymers, such as unsaturated polyester diluted with styrene; additional mixtures that may include such materials as silane molecules, binders, hardeners, initiators, inhibitors, pigments, dyes, colorants, and the like. Upon manufacturing of the lumps of composite materials, the lumps may further be used for the preparation of patterned artificial marble articles, such as patterned artificial marble slabs, wherein the lumps formed into the artificial marble articles may create the exhibited pattern of the artificial marble.

According to some embodiments, the inorganic quartz material may include sand of various particle sizes and indifferent combinations. For example, the quartz containing sand may include particles of a size of about of 0.05 mm to 10 mm. The quartz containing sand may include particles of a size of about of 0.05 mm to 8 mm. The quartz containing sand may include particles of the size of about 0.05 mm to 7 mm. The quartz containing sand may include particles of the size of about 0.05 mm to 6 mm. The quartz containing sand may include particles of the size of about 0.05 mm to 5.5 mm. The quartz containing sand may include particles of the size of about 0.05 mm to 5 mm. The inorganic quartz material may further include ground/milled sand of various particle sizes and in different combinations. For example, the ground/milled quartz containing sand may include grounded particles of the size of about 1 to 65 microns. The ground/milled quartz containing sand may include particles of the size of about 10 to 60 microns. The ground/milled quartz containing sand may include particles of the size of about 20 to 55 microns. The ground/milled quartz containing sand may include particles of the size of about 30 to 50 microns. The ground/milled quartz containing sand may include particles of the size of about 38 to 45 microns. The inorganic quartz material may further include such materials as basalt, glass, diamond, rocks, pebbles, shells, silicon, and any other material that may contain inorganic quartz.

According to further embodiments, the lumps of composite material may further include resin that may be mixed with the quartz particles to allow formation of the lumps structures. The resin may be comprised of polymers and binders. The polymers may include, for example, such materials as polyester, unsaturated polyester and the like, that may be diluted with, for example styrene. For example, the polymer may be comprised of 65% of unsaturated polyester, diluted with 35% styrene. The binders may include a mixture of various components, such as initiators, hardeners, catalysators, binding molecules and bridges, such as Silan bridges, and any other component that is known in the art and may be used for the preparation of composite stone material.

According to some embodiments, the lumps of composite material may further include a colorant that may include various dyes, pigments, colorants or any combination thereof. The colorants may be in the form of liquid, powder, paste, and the like, or any combination thereof. The colorants may include any organic or non-organic colorant. The colorants may further be diluted with various materials, such as polyester, styrene, butyl benzoate, methoxy propyl acetate, and the like. The colorants may be added at various stages during the manufacturing process of the lumps of composite material. The colorants may be added in various concentrations and various amounts during various stages of the manufacturing process. Furthermore, one or more colorants and/or a combination of colorants may be added during various stages of the manufacturing procedures of the lumps of composite materials.

According to some embodiments, the preparation of lumps of composite material may be performed in one or more mixing devices. The mixing devices may include any known mixing device, such as, for example, a mixer, a vertical axis mixer, a drum mixer, palletizer, and the like, or any combination thereof. In addition, the modifications to the mixing device may also be performed, wherein said modifications may aid in the preparation process of the lumps of composite material.

According to some exemplary embodiments, the preparation of lumps of composite material may be performed using a mixer. The mixer may include any kind of mixer, such as a vertical axis mixer. For example, the mixer may include a vertical mixer as described in publication no. WO 2006/084792, incorporated herein by reference. The mixer may have one or more mixing legs that may be attached to a common arm (that may be aligned with the revolving axis) and may thus revolve around a common axis. The mixing legs may be placed at varying distances from each other and may be located at any angle relative to the common axis. The mixer legs may revolve independently from each other, the mixer legs may revolve in synchronization with each other, or any combination thereof. The mixer may further include a container (such as a mixing bowl), into which various components of the lumps' composition may be added at an appropriate, predetermined order; at an appropriate time schedule; and at appropriate mixing conditions. Mixing conditions may include such conditions as mixing speed, mixing temperature and mixing blades that may be used. For example, mixing speed may be measured in units of rotational speed (rounds per minute (rpm)) and/or in units of peripheral speed (m/sec). For example, mixing speed may vary between different stages of the manufacturing process of the lumps of composite material and may be in the range of, for example, 1 to 15 m/sec.

Figure 1A:
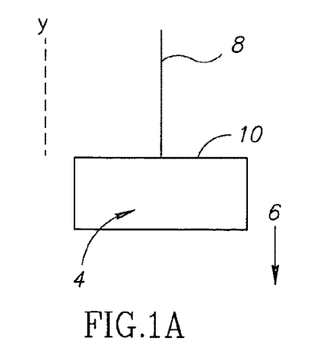
FIGS. 1A-F—Schematic illustration of modified mixing blades, according to some embodiments.
Figure 1B:
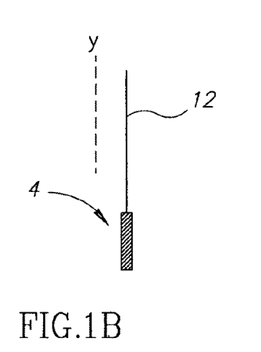
Figure 1C:
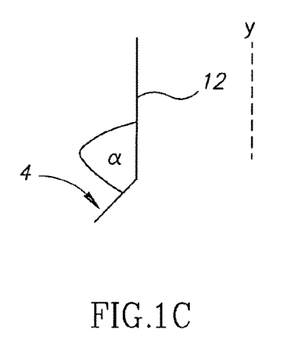
Figure 1D:
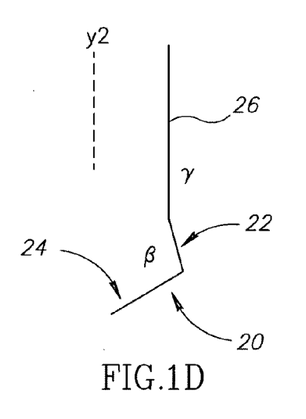
Figure 1E:
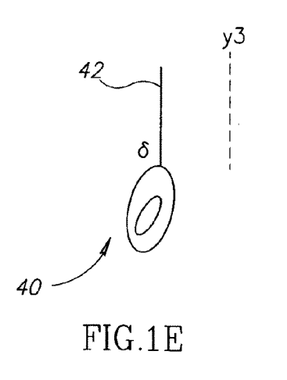
Figure 1F:
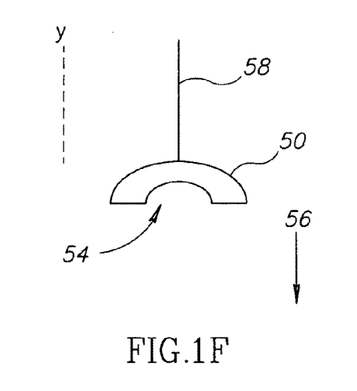

The mixing speed may include mixing at low speed, such as, for example in the range of, about 1 to 2 m/sec. For example, mixing temperature may be measured as the environment temperature or the container temperature at which the mixing procedure is being performed. For example, the mixing temperature may be in the range of 4 to 40 degrees Celsius. For example, the mixing temperature may be performed at room temperature, such as, for example, at the temperature of about 25 degrees Celsius. In addition, one or more of the mixing blades (mixing legs) used in the mixer may be adapted to be used for the formation of the lumps of the composite material. According to some embodiments, one or more of the mixer blades (legs) may be modified and adapted such that, at the end of the blades, at the region that contacts the materials to be mixed, an extended surface area may form. The extended surface area may be achieved, for example, by attaching an extension of various forms to the end of the mixing blade. The extension may assume various forms, such as, but not limited to: a flat, quadrangular plate; a plate that may be comprised of at least two flat surfaces; a spoon shaped plate, curved plate, and the like. The extension may further be situated at various angles as compared to the perpendicular axis of the mixer blade. Reference is now made to FIG. 1, which schematically illustrates modified mixing blades, according to some embodiments. As illustrated in FIG. 1A, which illustrates a front view of a modified mixing blade, according to some embodiments, an extension (such as extension 4 in FIG. 1A) may be attached to the mixing end (such as end 6) of the mixing blade (such as mixing blade 8). Extension 4 may have a shape of a flat quadrangular plate, wherein the mixing blade is attached at any point on the upper rib (10) of the circumference of the plate. The extension plate may be connected at various angles relative to the perpendicular axis (such as axis y in FIG. 1A) of the mixing blade. Reference is now made to FIGS. 1B and 1C, which illustrate a side view of a mixing blade with an extension plate. As shown in FIG. 1B, extension plate 4 may be attached to mixing blade 8 perpendicularly (at 0 degrees) to the perpendicular axis (y) of the mixing blade (12). As shown in FIG. 1C, extension plate 4 may be attached to mixing blade 8 at an angle ($\alpha$), which may be the angle between the upper rib (10) of the circumference of extension plate (4) and the perpendicular axis (y) of the mixing blade (12). Angle $\alpha$ may be any angle in the range of 0-180 degrees. According to other embodiments, extension to the mixing blade may include a plate that may have at least two planar flat quadrangle surfaces that may be positioned at any angle relative to each other. As illustrated in exemplary manner in FIG. 1D, which illustrates a side view of a mixer blade with an extension, according to some embodiments, the surfaces, such as upper surface 22 and lower surface 24, may be positioned at an angle $\beta$ relative to each other, to form extension 20. Angle $\beta$ may be any angle in the range of 0 to 90 degrees. Extension 20 may be situated at any angle ($\gamma$) relative to the perpendicular axis (y2) of the mixing blade (26), wherein angle $\gamma$ may be any angle in the range of 0-180 degrees and may be the angle between the upper rib (not shown) of the circumference of the upper surface (22) of extension plate (20) and the perpendicular axis (y2) of the mixing blade (26). Angle $\gamma$ may be any angle in the range of 0-180 degrees. According to other embodiments, the extension of the mixing blade may include any concaved shaped form, such as, for example, a spoon shaped form. As shown in FIG. 1E by way of example, of a side view of a mixing extension, according to some embodiments, extension 40 may have a concaved, spoon-like shape that may be attached to the mixing blade (42). Extension 40 may be attached to mixing blade 42 at an angle ($\delta$), which may be the angle formed between the central perpendicular axis (y3) of extension, such as extension 40 and the perpendicular axis (y3) of the mixing blade (42). Angle δ may be any angle in the range of 0-180 degrees. As illustrated in FIG. 1F, which illustrates a front view of a modified mixing blade, according to some embodiments, an extension (such as extension 54 in FIG. 1F) may be attached to the mixing end (such as end 56) of the mixing blade (such as mixing blade 58). Extension 54 may have a curved shape, and the mixing blade may be attached at any point on the upper rib (50) of the circumference of the extension plate. The extension plate may be connected at various angles relative to the perpendicular axis (such as axis y in FIG. 1F) of the mixing blade. Attachment between the mixing blade and the extension may be performed by various methods such as, adhering, welding, mechanical fitting, by use of bolts and nuts, and the like. The attachment between the mixing blade and the extension may be reversible or permanent. Attachment between the mixing blade and the extension may be performed such that the extension may form as an integral part of the mixing blade and/or as an integral extension of the mixing blade. Attachment between the mixing blade and the extension may be reversible and may allow changing the extension that may connect to the mixing blade.

Use of mixing blade extension such as the extensions exemplified hereinabove may aid in the formation of a desired form of the lumps of composite material. For example, the mixing process with the various extensions may result in a scooping action that may mix while shaping the form of the resulting lumps. For example, as a result of the scooping actions of the modified mixing blades, substantially rounded ball-like shaped lumps may be formed. Moreover, the scooping action may yield increasingly larger lumps, wherein the diameter of the rounded ball shaped lumps may be increased as a result of the continuous mixing action. The effect of the increasingly larger lumps may also be named herein as the "snow ball effect", as it may resemble in concept the formation of a snow ball, wherein the more turns the ball revolves, the more material ("snow") is collected on the face of the ball, and as a result the diameter of the ball is increased.

Figure 2:
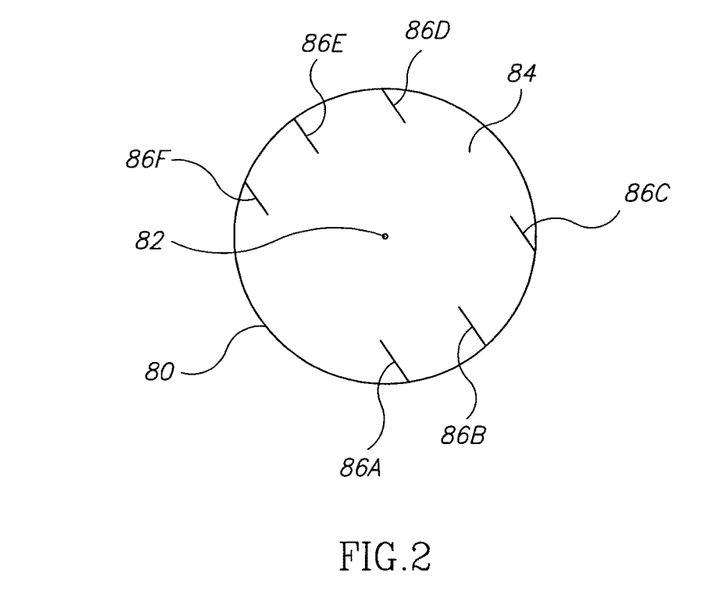
FIG. 2—Schematic front view illustration of a drum mixer, according to some embodiments.

According to additional embodiments, the mixer may include a drum mixer. A drum mixer may include a revolving drum that may be used for mixing of materials contained within the interior of the drum. As a result of the revolving movement of the drum along a central axis, the materials inside the drum may mix. In addition, the drum mixer may include a modified drum, wherein the interior walls of the drum may include ridges and/or perforations that may function as mixing blades that may increase the mixing efficiency and may further aid in a desired formation of lumps of composite materials. The cavity of the drum may include mixing blades that may be situated in any location within the drum cavity. The mixing blades may revolve independently of the mixing drum and may thus increase efficiency of the mixing and further aid in the formation of lumps of composite material. Reference is now made to FIG. 2, which schematically illustrates a front view of a drum mixer, according to some embodiments. As illustrated in FIG. 2, the drum mixer may include a mixing drum, such as drum 80 that may revolve clockwise around axis 82. A drum, such as drum 80, may include inner cavity, such as cavity 84 into which various materials to be mixed may be added. The interior walls of a drum, such as drum 80, may include perforations and ridges, such as ridges 86A-F, that may be situated at various distances along the interior walls of drum 80. Ridges, such as 86A-F may include flat elongated ridges that may protrude from the interior walls of the drum towards the cavity of the drum.

Ridges on the interior walls of the drum may include any number of ridges that may be situated at varying distances from each other along the interior walls of the drum. The ridges on the interior walls of drum 80 may form as an integral part of the interior walls of the drum, or may be attached by various methods to the interior walls of the drum. According to some embodiments, the ridges along the interior walls of the mixing drum may aid in the formation of a desired form of the lumps of composite material that may be mixed in the drum cavity. The revolving motion of the drum, in combination with the ridges in the interior walls of the mixing drum, may result in a scooping action that may mix while shaping the form of the resulting lumps. For example, as a result of the scooping actions of the revolving drum with the ridges on its interior walls, substantially rounded ball-like shaped lumps may be formed. Moreover, the scooping action may yield increasingly larger lumps, wherein the diameter of the rounded ball shaped lumps may be increased as a result of the continuous mixing action, in the snowball effect.

According to some embodiments, there is provided a method of manufacturing lumps of composite materials. The method may include, for example, mixing various quartz containing compositions, such as sand, of various particle sizes; addition of various colorants in various concentrations and amounts; additions of various resins, such as resins described hereinabove; at any predetermined order of addition and at any time predetermined time intervals between the various additions. The mixing may be performed in a mixer that may include modified mixing blades, in a drum mixer that may include a modified drum interior or an additional mixing blade(s), in a palletizer and any combination thereof. The method may further result in the production of lumps, wherein at least 60% of the mixture is converted to lumps at the termination of the process and wherein the lumps thus produced retain a stable structure. According to some embodiments, the method may further result in the production of lumps, wherein at least 85% of the mixture is converted to lumps at the termination of the process and wherein the lumps thus produced retain a stable structure. The lumps of composite materials thus manufactured may acquire the shape of, for example, substantially round balls, with a substantially smooth surface. The manufactured lumps of composite material may further be used for the preparation of artificial marble slabs. To this aim, the lumps of composite material may be poured into a mold in the form of a slab, which may then be compacted by a special vacuum and vibration process, at a pressure of about 100 tons. Then the slabs may be placed in a curing kiln, until they harden. The hardened slabs formed in this manner may exhibit a display pattern comprised of the arrangement of the lumps of the composite material within the compacted artificial marble slabs.

According to some embodiments, the properties of the lumps of composite material, such as shape, size, color, texture, strength, and the like may be determined by various factors. The factors may include chemical factors (such as mixture compositions), physical factors (such as size and form of particles in the mixture), mechanical factors (speed of mixing, type of mixer and mixing blade used), and the like. For example, the factors may include such factors as: the order at which the various constituents of the lumps are added into the mixture; the time intervals at which the various constituents are added into the mixture; the properties and appearance of the various constituents that are added into the mixture (size of particles, powder, liquid, and the like); the time intervals between the addition of the various constituents of the mixture (such as colorants, resins, and the like); the speed of mixing after and during addition of the various mixture constituents; the type and size of extension of the mixing blade; the size of the resulting lumps, the distribution of the resulting lumps in the slab, and the like.

According to further embodiments, the process of the preparation of lumps of composite material may include a continuous process and/or batch process. In a batch process, a mixture of various materials is mixed according to the manufacturing process, and the lumps that form may be collected at the end of the manufacturing process, which may terminate when the materials are all used/converted to lumps. In a continuous process, a continuous supply of materials is added to the mixture, and lumps are continuously formed and collected, throughout the manufacturing process.

According to some exemplary embodiments, the method for manufacturing lumps of composite material may include such steps as: unloading quartz particles, such as in the form of sand in the size of about 0.01 mm to 8 mm into a mixer bowl. For example, the size of the quartz particles may be in the range of, for example 0.065 mm to 2 mm. The mixer may be equipped with modified mixing blades that may include extensions, such as in the form of spoons. The mixer may mix at a speed in the range of, for example 6 to 14 rpm. Into the mixture, a colorant may be added. The colorant may be in the form of a powder or a liquid. The quartz particles and the colorant may be mixed at a speed of 1 to 10 rpm for about 1 to 10 seconds, after which the speed may be increased to, for example, the range of 12 to 24 rpm for additional 30 to 90 seconds. Into the mixture of quartz particles and colorant, a resin may be added. Addition of the resin may be performed while the mixer is mixing at a speed of, for example, 4 to 12 rpm. Upon addition of the resin, it may be mixed with the mixture of quartz particles and colorant at a speed of, for example, 1 to 10 rpm, and then the speed may be increased to a speed of, for example, 8 to 24 rpm. Next, additional quartz particles may be added to the mixture, while the mixture is mixing at the speed of about 2-12 rpm. The quartz particles added may be in the form of ground/milled quartz containing sand that may include particles of the size of about 1 to 60 microns. For example, the added ground/milled sand may include particles in the size of about 1 to 38 micron. For example, the added ground/milled sand may include particles in the size of about 38 to 45 micron. Upon addition of the ground sand particles to the mixture, the mixer may mix at a speed in the range of 2 to 12 rpm for 1 to 20 seconds, after which the mixer speed may be increased to a speed in the range of 12 to 26 rpm for a length of time of 20 to 80 seconds. Next, additional resin composition may be added to the mixture, while the mixer is mixing at a speed in the range of about 2 to 14 rpm. Next, one or more additional colorants may be added, together or sequentially, and mixed under conditions as above. The next mixing step of the resulting mixture may include mixing at a speed in the range of 8 to 22 rpm for 10 to 80 seconds. The final mixing step of the resulting mixture may include mixing at a speed of 2 to 14 rpm for about 500 to 1500 seconds. The final mixing step may be performed in the presence of colorant, which may result in the formation of lumps that may include a color coating at their outer surface. Furthermore, after the final mixing step, a colorant may be added to the mixture, and the mixer may mix for additional 10-120 seconds, at a speed of 2-12 rpm. This step may further result in the formation of lumps that may include a color coating at their outer surface.

According to some embodiments, the method for manufacturing lumps of composite material may result in the formation of substantially smooth, round, shaped lumps that may exhibit various colors and various sizes. Timing of addition of the colorant(s) to the mixture of the lumps of composite materials, amount of colorant(s) added to the mixture, and/or type of colorant(s) added to the mixture may determine the final appearance of the resulting lumps. For example, the lumps may exhibit more than one color that may be distributed within and/or on the surface of the lumps. For example, the color(s) may be distributed evenly within the lumps; the colors may be distributed evenly on the surface of the lumps; the colors may be distributed unevenly within the lumps; the colors may be distributed unevenly on the surface of the lumps, and/or any combination thereof. According to some exemplary embodiments, the interior layers (core) of the lumps may include one or more colorants, and the exterior layer (surface) of the lumps may be coated with additional colorant(s).

According to some embodiments, the lumps of composite material manufactured as detailed hereinabove may be used for the preparation of patterned artificial marble and patterned artificial marble slabs. For example, lumps of a desired form (for example, rounded lumps); and of a desired size (for example, a diameter of 0.01-10 cm, a diameter in the range of 0.5-2 cm, and the like); and of a desired texture (for example, smooth); of a desired color or combination of colors; and of a desired color distribution (for example, within the lumps, at the external surface of the lumps, and the like) may be used for the preparation of artificial marble slabs. The lumps may be mixed with one or more additional materials such as: organic polymer(s) (like resins); inorganic quartz matrix; linkers (such as silane molecules); additional colorants (such as dye, pigments, and the like); chemical reagents; antimicrobial reagents; and the like that may be used in the creation of the artificial marble slabs. The resulting mixture may be poured into a mold in the form of a slab (for example, at a size of 306 cm×144 cm). The slab may then be compacted by a special vacuum and vibration process at a pressure of about 100 tons. Then the slabs may be placed in a curing kiln, for example, at 80° C. to 115° C. for 30 to 45 minutes until they harden and assume natural stone properties, with a pattern that may be created by the lumps of composite material that were used for the preparation of the artificial marble.

Figure 3A:
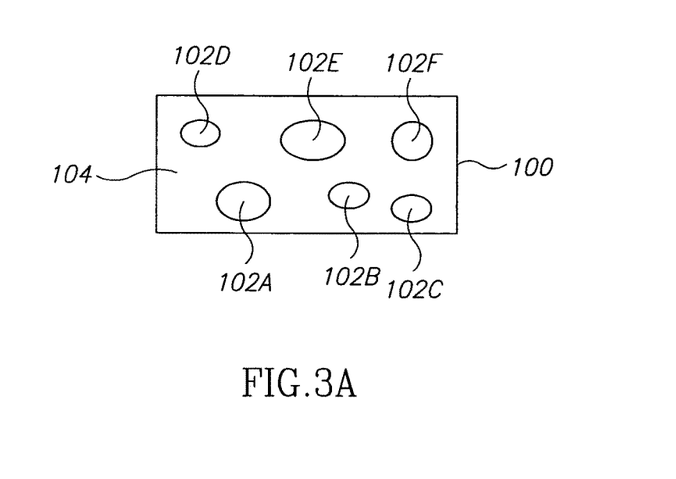
FIGS. 3A-B—Schematic illustration of artificial marble, according to some embodiments.
Figure 3B:
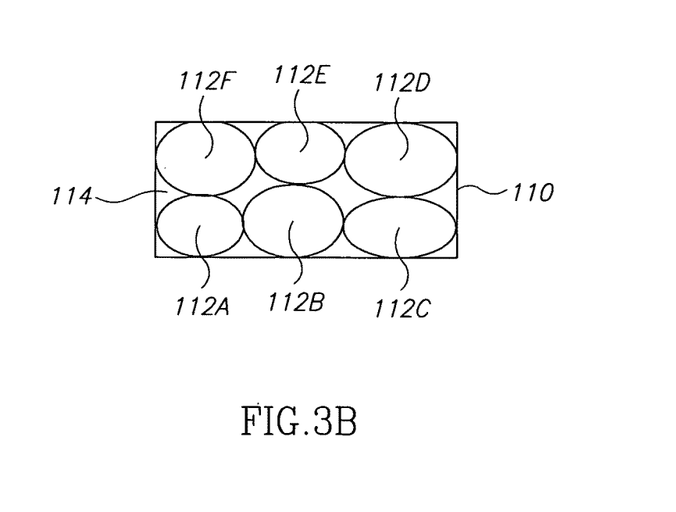

Reference is now made to FIGS. 3A-B, which illustrate schematic drawings of artificial marble slabs, manufactured by using lumps of composite material, according to some embodiments. As mentioned hereinabove, the characteristics of the lumps used for the preparation of the artificial marble slabs, such form of the lumps, size of the lumps, texture of the lumps, color of the lumps, color distribution of the lumps, and the like, may determine the pattern of the artificial marble slabs. For example, FIG. 3A schematically illustrates an artificial marble slab prepared by use of lumps and additional materials, as detailed hereinabove. As shown in FIG. 3A, an artificial marble slab, such as slab 100, may exhibit a pattern that may be created by lumps, such as lumps 102A-F. Lumps, such as 102A-F may be small diameter round lumps, and the space between the lumps (matrix, 104) may include additional materials, such as organic polymer inorganic quartz matrix; linkers such as silane molecules, and the like that may be used as fillers. Additional example is illustrated in FIG. 3B, which schematically illustrates an artificial marble slab prepared by use of lumps and additional materials, as detailed hereinabove. As shown in FIG. 3B, an artificial marble slab, such as slab 110, may exhibit a pattern that may be created by lumps, such as lumps 112A-F. Lumps, such as 112A-F, may be large diameter round lumps. The small space that may form between the lumps (matrix, 114) may include additional materials, such as organic polymer inorganic quartz matrix; linkers such as silane molecules, and the like.

Figure 3C:
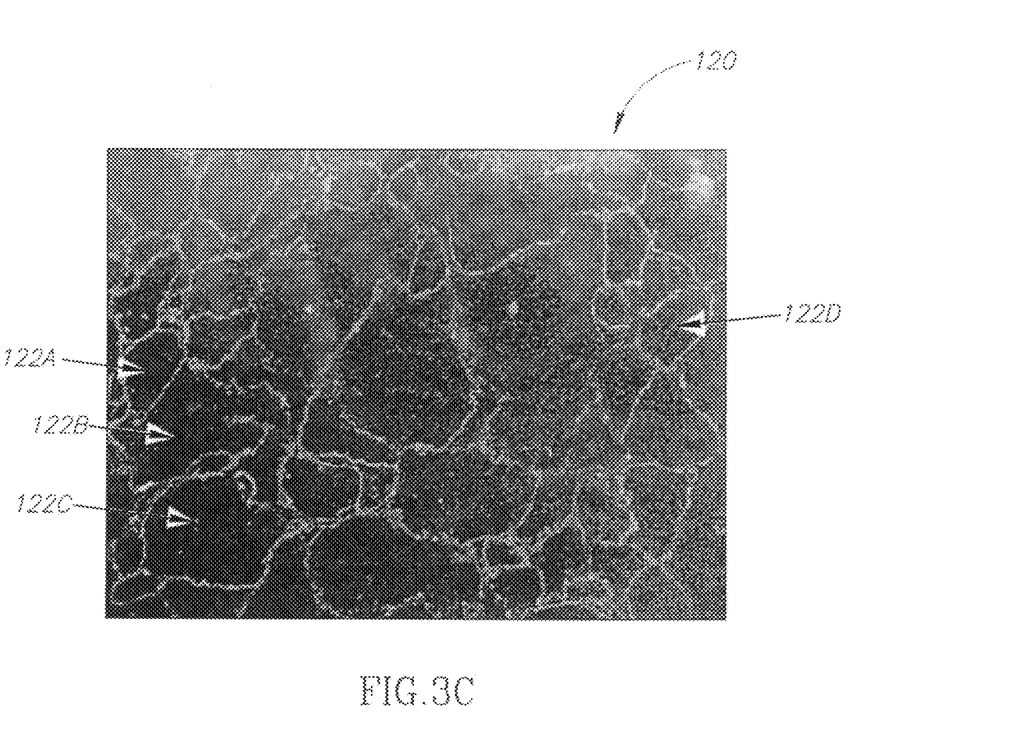
FIGS. 3C-J—images of exemplary artificial marble slabs, according to some embodiments.
Figure 3D:
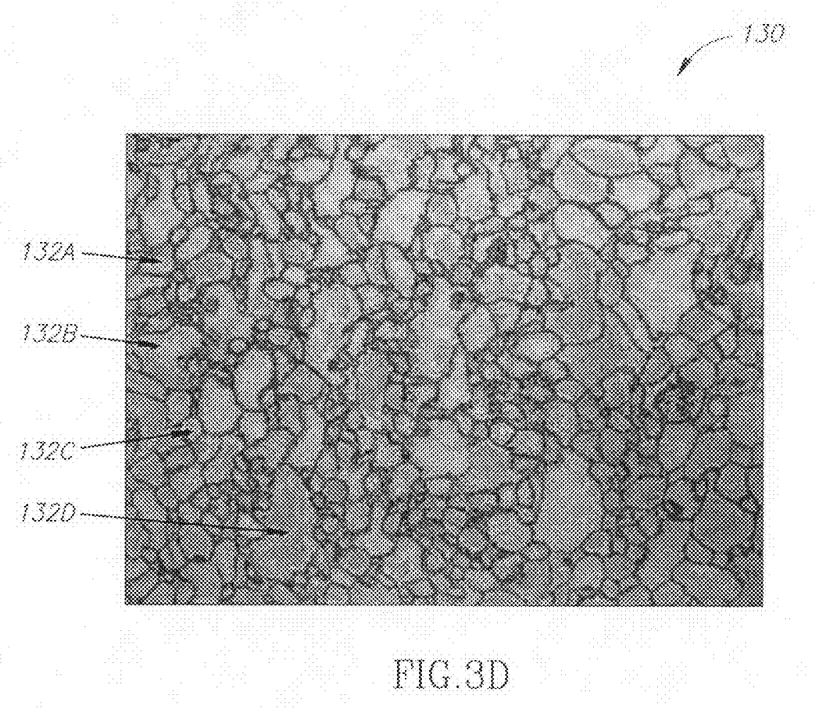
Figure 3E:
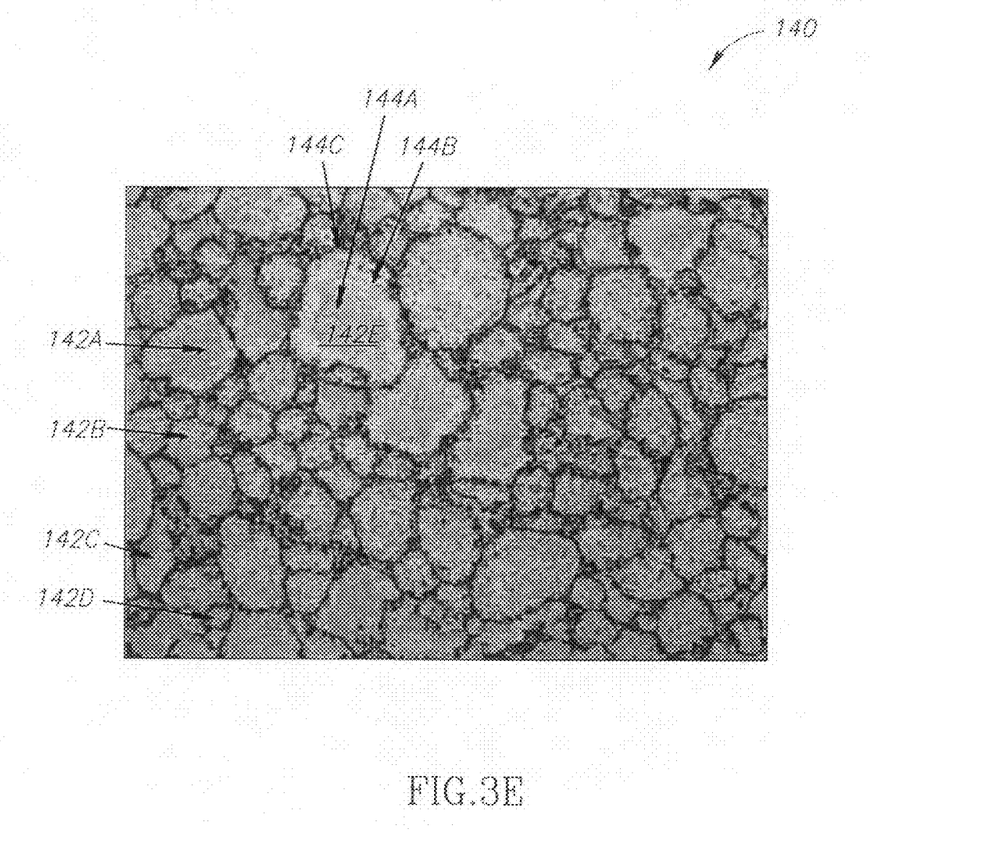
Figure 3F:
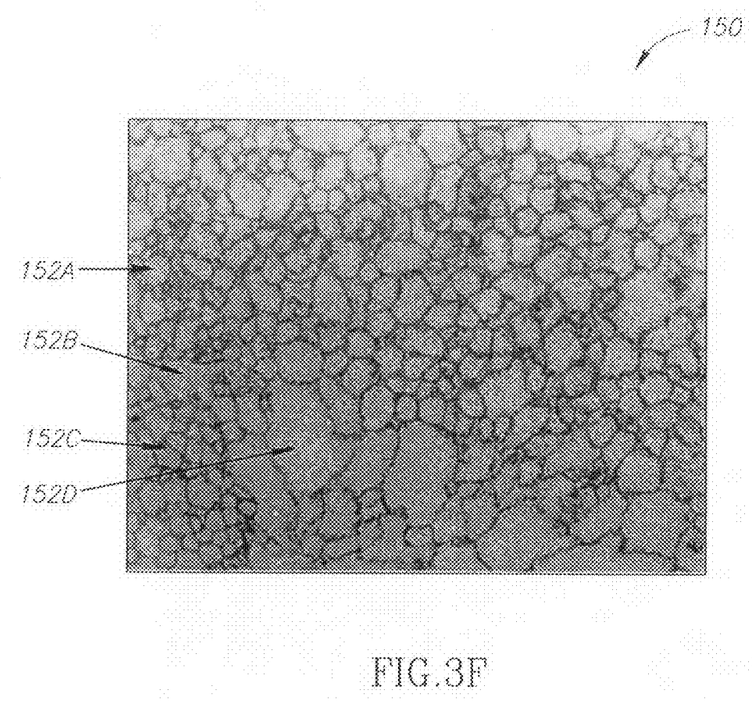
Figure 3G:
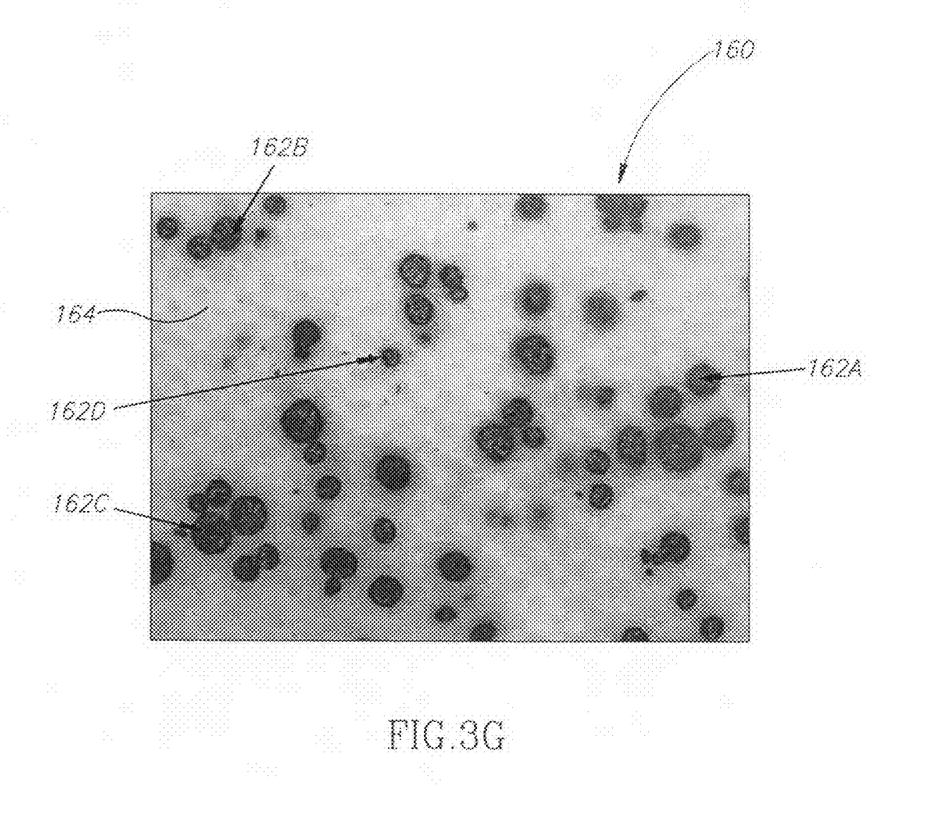
Figure 3H:
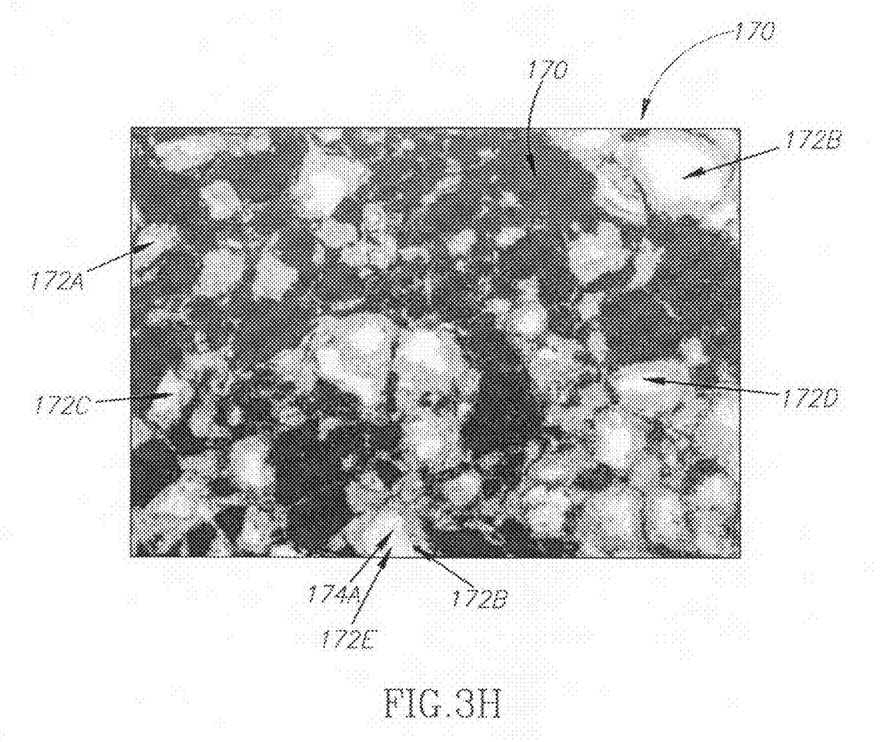
Figure 3I:
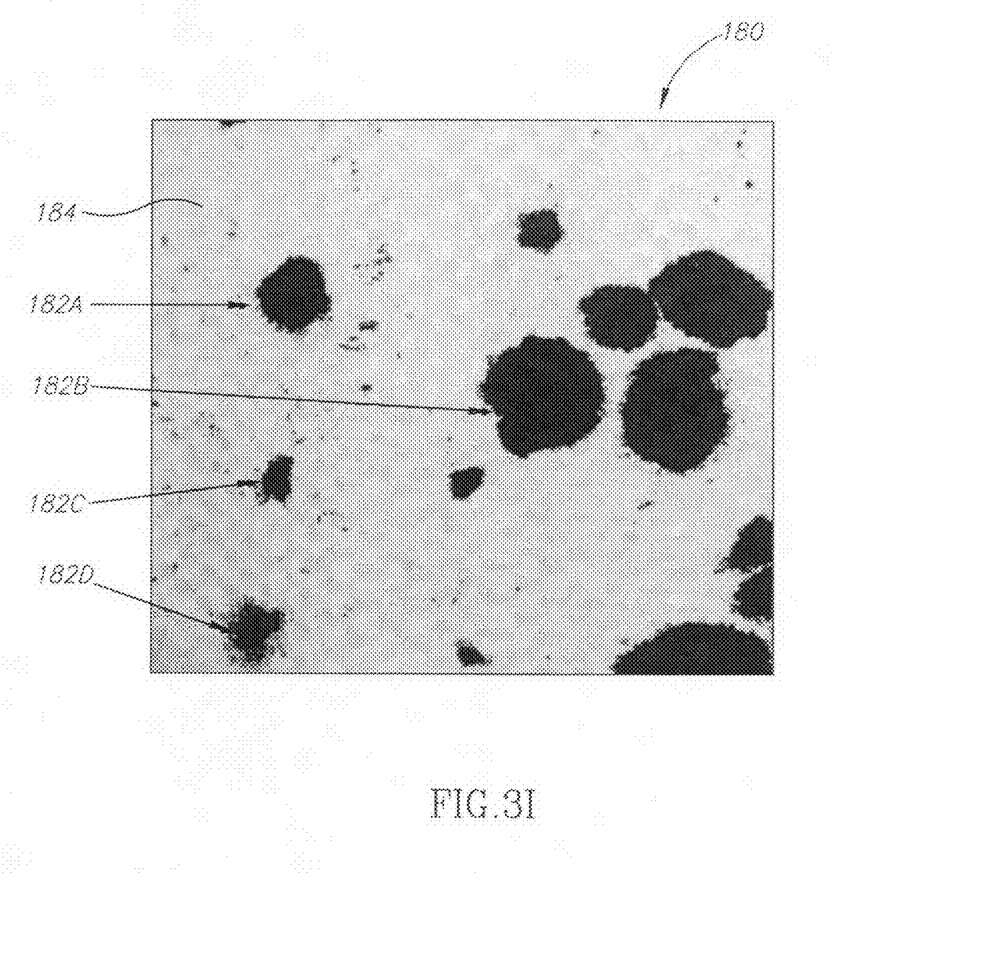
Figure 3J:
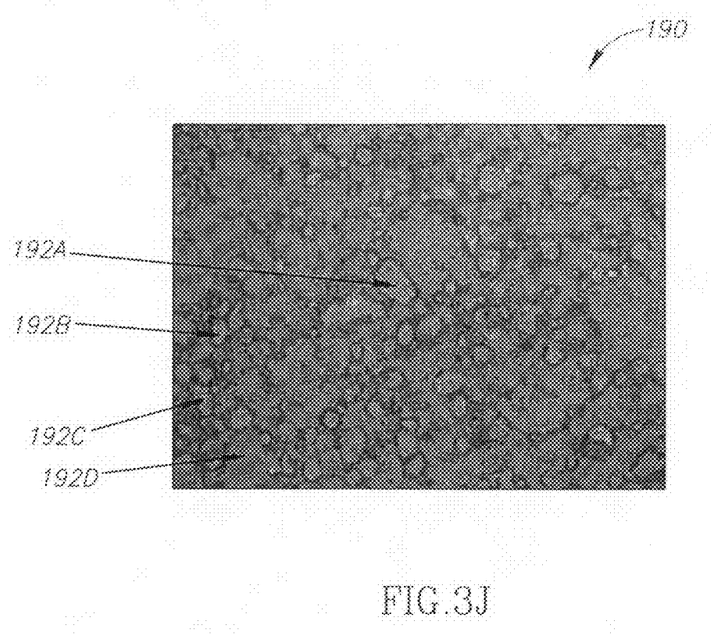

Reference is now made to FIGS. 3C-J, which show exemplary pictures of artificial marble slabs, prepared by use of lumps and additional materials, as detailed hereinabove. As shown in FIG. 3C, an artificial marble slab, such as slab 120, may exhibit a pattern that may be created by lumps, such as, for example, lumps 122A-D. Lumps, such as 112A-D may be substantially round (circular) lumps that may comprise essentially most of the area of the artificial marble slab. The lumps may include one or more colorants, wherein the inner layer (core) of the lump is of a different color than the outer layer (surface) of the lump. As shown in FIG. 3D, an artificial marble slab, such as slab 130, may exhibit a pattern that may be created by lumps, such as lumps 132A-D. Lumps, such as, for example, 132A-D may be substantially circular lumps that may comprise essentially most of the area of the artificial marble slab. The lumps may include one or more colorants, dispersed in various layers of the lump. As shown in FIG. 3E, an artificial marble slab, such as slab 140, may exhibit a pattern that may be created by lumps, such as, for example, lumps 142A-D. Lumps, such as 142A-D may be substantially circular lumps that may comprise essentially most of the area of the artificial marble slab. The lumps may include one or more colorants in various layers of the lump composition. For example, a lump, such as lump 142E may include a first colorant (144A) and second colorant (144B) at internal layers (core); and an additional colorant (144C) coating the outer layer (boundaries/surface) of the lump. As shown in FIG. 3F, an artificial marble slab, such as slab 150, may exhibit a pattern that may be created by lumps, such as, for example, lumps 152A-D. Lumps, such as 152A-D, may be substantially circular lumps that may comprise essentially most of the area of the artificial marble slab. The lumps may include one or more colorants, dispersed in various layers of the lump. As shown in FIG. 3G, an artificial marble slab, such as slab 160, may exhibit a pattern that may be created by lumps, such as lumps 162A-D. Lumps, such as 162A-D, may be substantially round lumps that may comprise at least part the area of the artificial marble slab. The space between the lumps, shown as bright background is the matrix (164) of the slab. The lumps may include one or more colorants, dispersed in various layers of the lump. As shown in FIG. 3H, an artificial marble slab, such as slab 170, may exhibit a pattern that may be created by lumps, such as, for example, lumps 172A-D. Lumps, such as 172A-D may be substantially amorphous lumps that may comprise at least part of the area of the artificial marble slab. The space between the lumps, shown as dark background is the matrix (174) of the slab. The lumps may include one or more colorants at various layers of the lump composition. For example, a lump, such as lump 172E, may include a first colorant (174A) at an internal layer (core) and additional colorant (174B) at an outer layer of the lump. As shown in FIG. 3I, an artificial marble slab, such as slab 180, may exhibit a pattern that may be created by lumps, such as, for example, lumps 182A-D. Lumps, such as 182A-D may be substantially circular-spiked lumps that may comprise at least part of the area of the artificial marble slab. The space between the lumps, shown as bright background is the matrix (184) of the slab. As shown in FIG. 3J, an artificial marble slab, such as 190, may exhibit a pattern that may be created by lumps, such as, for example, lumps 192A-D. Lumps, such as 192A-D may be substantially circular (round) lumps that may comprise essentially most of the area of the artificial marble slab. The lumps may further include one or more colorants that may be dispersed in various layers of the lump.

While a number of exemplary aspects and embodiments have been discussed above, those of skill in the art will recognize certain modifications, permutations, additions and sub-combinations thereof. It is, therefore, intended that the following appended claims and claims hereafter introduced be interpreted to include all such modifications, permutations, additions and sub-combinations as are within their true spirit and scope.

We claim:

1. An engineered stone slab having coated lumps of composite stone material, wherein at least a portion of the coated lumps comprise an inner core having a first property and an outer layer having a second property, wherein at least a portion of the coated lumps includes two or more colored coating layers, wherein each layer is colored by a different colorant or a similar colorant different dosages and/or concentrations.

2. The slab of claim 1, wherein the property comprises color, texture, density, chemical composition, hardness, porosity or any combination thereof.

3. The slab of claim 1, wherein the distribution of the lumps within the slab is uniform, non-uniform or both.

4. The slab of claim 1, wherein the size of the lumps is uniform, non-uniform, or both.

5. The slab of claim 1, wherein the shape of the lumps is substantially square, substantially round, substantially circular, spiked, amorphous or any combination thereof.

6. The slab of claim 1, wherein the lumps may have a smooth surface, an uneven surface, or a rigid surface.

7. The slab of claim 1, wherein the lumps of composite stone material include one or more layers, wherein said layers may have different properties.

8. The slab of claim 7, wherein the properties comprise color, texture, density, chemical composition, hardness, porosity or any combination thereof.

9. The slab of claim 1, wherein the lumps of composite stone material include a first inorganic particulate material including particles having a size range of about 0.05 mm to about 5 mm and a second inorganic particulate material including particles having a size range of about 35 micron to about 50 microns.

10. The slab of claim 1, wherein at least a portion of the lumps include at least one colored coating layer.

11. The slab of claim 10, wherein said slab has a veined effect.

12. An engineered stone slab having coated lumps of composite stone material, wherein the lumps of composite stone material include one or more layers, wherein said layers may have different properties, wherein at least portion of the coated lumps comprise an inner core having a first property an outer layer having a second property, wherein at least a portion of the coated lumps includes two or more colored coating layers, wherein each layer is colored by a different colorant or a similar colorant at different dosages and/or concentrations.

13. The slab of claim 12, wherein the different properties comprises color, texture, density, chemical composition, hardness, porosity or any combination thereof.

14. An engineered stone slab having coated lumps of composite stone material, wherein the lumps of composite stone material include at least one colored coating layer, wherein at least a portion of the lumps includes two or more colored coating layers, wherein each layer may be colored by a different colorant or a similar colorant at different dosages and/or concentrations.

15. The slab of claim 14, wherein said slab has a veined effect.

16. The engineered stone slab of claim 1, comprising a finished upper surface, said upper surface having a veined effect.

17. The engineered stone slab of claim 1, wherein coated lumps of composite material are separated by a three dimensional network of a second material differing from the coated lumps by at least one property.

* * * * *